United States Patent [19]

Bivans et al.

[11] 4,064,315
[45] Dec. 20, 1977

[54] MALEIC ANHYDRIDE-MODIFIED POLYMER LAGER COATED WITH POLYMERIC COMPOSITION DERIVED FROM VINYLIDENE CHLORIDE

[75] Inventors: David A. Bivans, Macedon; Gary L. Duncan, Pittsford, both of N.Y.

[73] Assignee: Mobil Oil Corporation, New York, N.Y.

[21] Appl. No.: 712,628

[22] Filed: Aug. 9, 1976

Related U.S. Application Data

[63] Continuation of Ser. No. 504,572, Sept. 9, 1974, abandoned.

[51] Int. Cl.$^2$ ............... B32B 27/08; C08L 23/14
[52] U.S. Cl. .................. 428/518; 260/897 B; 428/520
[58] Field of Search ............ 260/897 B; 428/518, 428/520

[56] References Cited

U.S. PATENT DOCUMENTS

| | | | |
|---|---|---|---|
| 3,284,380 | 11/1966 | Davis | 260/897 B |
| 3,475,369 | 10/1969 | Blunt | 260/897 B |
| 3,483,276 | 12/1969 | Mahlman | 260/897 B |
| 3,497,574 | 2/1970 | Press | 260/897 B |
| 3,595,943 | 7/1971 | Brunson et al. | 260/897 B |
| 3,658,948 | 4/1972 | McConnell | 260/897 B |
| 3,671,356 | 6/1972 | Klinanen | 428/520 |
| 3,695,923 | 10/1972 | Thompson | 428/518 |
| 3,707,393 | 12/1972 | McDonald | 428/518 |
| 3,714,106 | 1/1973 | Smith | 260/897 B |
| 3,856,889 | 12/1974 | McConnell | 260/897 B |

*Primary Examiner*—J.C. Cannon
*Attorney, Agent, or Firm*—Charles A. Huggett; James D. Tierney

[57] ABSTRACT

Polypropylene resins compounded with a maleated polyolefin (e.g., polyethylene or polypropylene) provide film compositions having improved adhesion to polyvinylidene chloride coatings and resistance to the deleterious effect of moisture upon adhesion thereby avoiding need of a primer coat. Specific embodiments include biaxially oriented polypropylene film made from polypropylene compounded with such a maleated polyolefin and directly coated with a polyvinylidene chloride coating.

3 Claims, No Drawings

MALEIC ANHYDRIDE-MODIFIED POLYMER LAGER COATED WITH POLYMERIC COMPOSITION DERIVED FROM VINYLIDENE CHLORIDE

This is a continuation, of application Ser. No. 504,572, filed Sep. 9, 1974, and now abandoned.

BACKGROUND OF THE INVENTION

1. Field of the Invention

This invention relates to coated polypropylene films having improved heat seal strength, a higher level of coating to film adhesion and greater resistance to the deleterious effects of moisture, i.e., high humidity conditions, upon adhesion.

More particularly, it relates to such polypropylene films comprising polypropylene resins compounded with a minor amount of a maleated polyolefin resin and directly coated with a polyvinylidene chloride coating.

2. Description of the Prior Art

The introduction of oxygen in the form of carbonyl groups on the surface of polyolefin films has been widely used as a means of increasing the wetting and adhesion of coatings. In most cases, the oxygen concentration is increased by oxidation brought about by flame or corona discharge surface treatment. This adhesion enhancement is primarily due to the high electronegativity of the bonded oxygen atom and its tendency to promote hydrogen bonds with suitable proton donors present in the coating.

To our knowledge, maleated polyolefinic resins have never before been used (in combination) with isotactic polypropylene homopolymer resins as adhesion promoters for use with polyvinylidene chloride (PVDC) coatings.

The unique features of this invention in comparison to the present state of the art are as follows:

1. PVDC coated polypropylene film can be made that has a higher level of coating to film adhesion and a greater resistance to the deleterious effects of moisture upon adhesion.
2. These additive systems, when compounded with polypropylene, improve coating to base film adhesion to the extent that one step coating is a practical method of application, hence the need for a primer is eliminated.

SUMMARY OF THE INVENTION

In accordance with this invention coated polypropylene films are provided having greater film to coating adhesion, greater resistance to the deleterious effects of moisture upon adhesion and with no need for a primer coat. This is accomplished by the novel and unobvious combination of a base polypropylene resin with a minor amount of a maleated $C_2$-$C_4$ polyolefinic resin.

DESCRIPTION OF SPECIFIC EMBODIMENTS

A prime prior art method of increasing the oxygen content of polyolefin film was to increase the number of carbonyl groups on the surface of the polyolefin through, for example, flame or corona discharge treatment of the films' surface thereby increasing the wetting and adhesion of coatings thereafter applied to the base polyolefin film.

This invention utilizes, in a similar manner, the tendency of the oxygen in carbonyl groups to hydrogen bond. By artificially adding carbonyl containing material to the film, i.e., compounding with maleated polyolefins, the bulk hydrogen bonding character is effectively increased over that of corona discharge treated film.

This invention, therefore, uses maleic anhydride modified polyethylene and polypropylene resins as sources of additional carbonyl groups. The double carbonyl on each maleic anhydride modified group can contribute to two hydrogen bonds. When compounded with polypropylene homopolymer these groups add to the adhesion effect brought about by the normal surface treatment.

Polyvinylidene chloride coating of biaxially oriented film made of these resin formulations is nearly a chemically ideal situation. The high electronegativity of the two chlorine atoms attached to every other carbon, in the PVDC macro-molecule, causes a significant displacement of the molecular electron cloud toward each chlorine. This displacement produces an electron deficient region about each hydrogen atom. Consequently, when the polypropylene resin formulations, comprising this invention are PVDC coated, numerous hydrogen bonds are formed between the hydrogen of the PVDC coating and the carbonyl, for example:

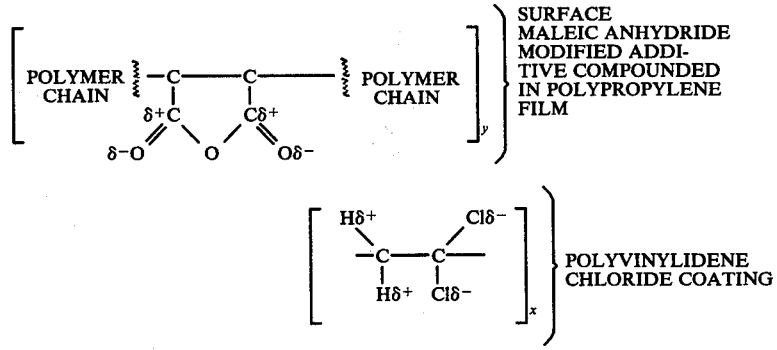

HYDROGEN BONDING (SHOWING ONLY ONE BOND AS AN EXAMPLE)

The resulting hydrogen bonding is much more numerous than that produced by corona discharge treatment alone. As a result of the enhanced basefilm to PVDC coating adhesion, the film to film heat sealing characteristics are considerably improved.

Any conventional base polypropylene resin prepared in any suitable manner may be used in this invention. However, especially preferred are essentially isotactic crystalline polypropylene resins which exhibit the following general properties:

Melt Flow Index: 0.5 – 12
Crystalline Melting Point ° F: 305 – 340
Inherent Viscosity: 1.4 – 4.0
Molecular Weight (wt. av.): 100,000 – 600,000
Density (gm/cc): 0.89 – 0.91

The maleated $C_2$-$C_4$ polyolefin additive may be derived from maleic acid or its anhydride, copolymerized with any suitable $C_2$-$C_4$ polyolefin. Pertinent properties of two suitable maleated polyolefins marketed by Eastman Chemical are tabulated below in Table I.

TABLE I
PROPERTIES OF MALEATED POLYOLEFIN ADDITIVES

| Composition | Polyethylene maleic anhydride copolymer | Polypropylene-maleic anhydride copolymer |
|---|---|---|
| Ring and Ball Softening at Pt. ° C. | 106 | 157 |
| Molecular Weight, Approx., | 8000 | 4500 |
| Density ° C. | 0.908 | 0.934 |
| Acid Number | 5$^a$ | 45 |
| Brookfield Visc. 190° C. cp/ | 1200$^b$ | 370 |
| Color Gardner Scale | 1 | 11 |
| Penetration Hardness, 100 gm/5 sec/25° C. tenths of mm. | 3 | 0-1 |
| Melt Index, 190° C, | 1700 | — |

$^a$Saponification number
$^b$150° C.

The PVDC coatings of the type utilized in this invention are generally referred to by their manufacturers as "primerless" PVDC coatings. These coatings preferably are water based emulsion coatings composed of 80-90% vinylidene chloride and 10-20% comonomer. The comonomer usually is a mixture of two or more polymerizable materials selected from the group consisting of vinyl chloride, acrylonitrile methyl acrylate, ethyl acrylate, methyl methacrylate, butylacrylate, 2-ethyl-hexyl acrylate, acrylic acid, methacrylic acid, Na-2-(methacroyloxy) ethane sulfonate, etc.

These coatings generally are prepared by an emulsion polymerization technique. The emulsifier level is kept low, or in some cases emulsifiers are used which become an integral part of the polymer structure and in effect, disappear during the polymerization. This is done in order to minimize the poisioning effect of the emulsifier upon the adhesion of the coating.

We have found that a coating produced by the A.E. Staley Manufacturing Company, Polidene $^{(R)}$P-528 latex, in combination with the maleated polyolefin modified OPP (oriented polypropylene) basefilm gives especially good performance. This coating is described in Ger. Offen. 2,019,461, 12 Nov. 1970, which describes the PVDC latex coating as follows:

"Stable (polyvinylidene chloride) latex coating compounds were prepared from a non-polymerizable anionic emulsifier, and a copolymer of vinylidene chloride (I), ethylenically unsatd. sulfonic acid, an unsatd. carboxylic acid, and another ethylenically unsatd. monomer. Thus, a latex prepared from I, methyl acrylate, acrylic acid, Na-2-(methacroyloxy) ethanesulfonate, emulsifiers (Igepal CO-880, Brij 35), Na lauryl sulfate, $Na_2HPO_4$, ascorbic acid, $H_2O_2$, and a seeding latex prepared from smaller amounts of the same compounds was coated onto glow discharge-treated polypropylene, and laminates made having high peel strength."

Below are listed some basic properties of the PVDC coatings by A. E. Staley:

TABLE II

| TYPICAL PROPERTIES | |
|---|---|
| Solids, minimum % | 45 |
| pH | 2.0 – 2.5 |
| Viscosity, cps. (Brookfield) #1 Spindle 60 rpm, 25° C. | 25 – 125 |
| Surface Tension, dynes/cm | 56 |
| Particle Size, microns | 0.02 – 0.21 |
| Density lbs./gal | 10.1 |
| Specific Gravity | 1.226 |
| Color | Creamy White |
| STABILITY | |
| Heat Stability | Greater than 200° F. |
| Storage* | Excellent |
| Freeze Thaw** | 3 cycles |
| Mechanical*** | Excellent |

*At least seven months. Product should be stored under moderate temperature conditions. (40° F. to 90° F.
**POLIDENE P-528F is freeze-thaw stable through 3 cycles. There may be a slight increase in viscosity noticeable, but performance is not affected. If frozen, the emulsion should be allowed to thaw slowly. Do not heat.
***No coagulum after 30 minutes in Omni-Mixer 17,500 RPM. The foam number remained the same from 5-30 minutes shear - 50 to 100 ml foam per 100 ml emulsion.

The following examples are in no way intended to limit this invention but merely to provide an illustration of how the maleated polyolefin modified polypropylene films, according to this invention, are prepared and subsequently coated.

The Examples (I – III) illustrate a method of preparing the modified basefilm formulations, i.e., compounding the above-described polypropylene resins with the disclosed maleated polyolefin additives. All of the procedures identified are considered standard for most polyolefin resin and saran coatings.

Each of the resin mixes was compounded on a type D-3001 Prep Center Universal Mixer/Extruder (C. W. Brabender Instruments, Inc.), equipped with roll style high shear blades.

SPECIFIC EXAMPLES

Example I

2% Maleated Polyethylene/Polypropylene Film

After a fluxing chamber was allowed to reach a temperature of ~175° C., it was charged with ~196 grams of polypropylene (PP) resin. The PP resin became molten, and 4 grams of a maleated polyethylene resin as disclosed herein were added thereto. The cavity was then closed, and subsequently fluxed for 25 minutes at 50 rpm. The molten compounded resin was subsequently removed, ground into chips, and then stored in plastic bags.

Subsequently, the compounded resin was molded into 35 mil plaques under pressure at 450° F. The standard molding technique used was as follows:

I. 1 minute of just platen contact.
II. 1 minute at slight positive pressure.
III. 1 minute up to 2000 PSI.
IV. 5 minutes at 2000 PSI.
V. Quench in water at 68° F.

Each plaque was then trimmed to 2⅜ inches × 2⅜ inches for stretching on the T. M. Long laboratory film stretcher (T.M. Long, Inc., Somerville, N.J.) and the trimmed plaques stretched at 300° F. 5×MD by 7×TD.

The edges of the ∼ 1 mil stretched film were trimmed prior to taping it to a back up roll of BOPP basefilm for coating on a suitable laboratory coater. The thus prepared specimens were then coated with Staley P528 saran formulation as described below at 110° C. with a 12 sec. oven residence and a No. 120 gravure roll.

| Saran Formation (at 22% total solids) | |
|---|---|
| Staley Polidene P528F PVDC (at 45% total solids) | 300 gms |
| Michem carnauba wax emulsion (at 25% total solids) | 5.4 gms. |
| Demineralized Water | 300 gms |

These coated samples, according to the invention, were tested for heat seal and adhesion; see Tables III and IV.

EXAMPLE II

2% Maleated Polypropylene/Polypropylene Film

Following the procedure of Example I 2% maleated polypropylene modified polypropylene film was prepared.

EXAMPLE III

5% Maleated Polyethylene/Polypropylene Film

Following the procedure of Example I, 190gms. of polypropylene and 10 gms. of maleated polyethylene were used to prepare a 5% sample of maleated polyethylene modified polypropylene film.

The polypropylene films embodied herein may be modified with from about 1.5–7.5% of the maleated polyolefin, based on the weight of the polypropylene resin; 2% and 5% are especially preferred percentages. Thus it is contemplated that the polypropylene/maleated polyolefin resin will contain from about 92.5 – 98.5 wt.% of the unmodified polypropylene resin. Additionally, the inherent viscosity of the unmodified polypropylene may vary from about 1.25 – 5.0; 1.4 – 4.0 is especially preferred.

Accordingly, this invention encompasses compositions adapted for use as thermoplastic film substrates, comprising a major amount (92.5–98.5 wt.%) of a polypropylene resin as described herein compounded with or modified by a minor amount (1.5–7.5wt%) based on the weight of the polypropylene resin of a maleated $C_2$–$C_4$ polyolefin resin or mixtures of such polyolefin resins having a direct surface coating of polyvinylidene chloride.

TABLE III: HEAT SEAL PROFILE

COMPARISON BETWEEN PVDC COATED, UNMODIFIED PP AND ADHESION PROMOTOR MODIFIED PP FILM

| | | PVDC COATED UNMODIFIED BOPP | PVDC COATED 2% MALEATED PE & BOPP | PVDC COATED 2% MALEATED PP & BOPP | PVDC COATED 5% MALEATED PE & BOPP |
|---|---|---|---|---|---|
| ESM HEAT SEALS | | | | | |
| (5 psi, 2.0 sec. dwell) | 200° F. | 135 | 130 | 92 | 195 |
| (gm/in.) | 210° F. | 155 | 212 | 137 | 262 |
| | 220° F. | 145 | 253 | 182 | 395 |
| | 230° F. | 135 | 247 | 220 | 425 |
| | 240° F. | 130 | 253 | 232 | 477 |
| | 250° F. | 120 | 293 | 262 | 305 |
| | 260° F. | 110 | 213 | 250 | 247 |
| | 270° F. | 150 | 285 | 262 | 275 |
| | 280° F. | 145 | 245 | 260 | 287 |
| | 290° F. | 95 | N.R. | N.R. | N.R. |
| AVG HEAT SEAL (gm/in.) | | | | | |
| X ± σ* | | 132 ± 20 | 237 ± 48 | 211 ± 62 | 330 ± 94 |
| AVG. COATING WT. (gm/1000in$^2$) | | 1.3 | 1.6 | 1.6 | 4.3 |

N.R. = No Reading
*1 standard deviation

TABLE IV: HIGH HUMIDITY CONDITIONED HEAT SEALS

COMPARISON BETWEEN PVDC COATED, UNMODIFIED PP FILM AND ADHESION PROMOTER MODIFIED PP FILM

| | | PVDC COATED UNMODIFIED BOPP | PVDC COATED 2% MALEATED PE & BOPP | PVDC COATED 2% MALEATED PP & BOPP | PVDC COATED 5% MALEATED PE & BOPP |
|---|---|---|---|---|---|
| 72 HR. JUNGLE ROOM CONDITIONED ESM HEAT SEALS (CONDITIONED 100° F. & 90% R.H.) (SEALS RUN 5 psi, 2.0 sec. dwell) | | | | | |
| (gm/in.) | 200° F. | 0 | 107 | 70 | 145 |
| | 210° F. | 0 | 145 | 52 | 130 |
| | 220° F. | 20 | 130 | 60 | N.R. |
| | 230° F. | 25 | 140 | 82 | N.R. |
| 240° F. | | 20 | 125 | 95 | 240 |
| | 250° F. | 20 | 145 | 110 | N.R. |
| | 260° F. | 15 | 157 | 65 | 160 |
| | 270° F. | 25 | 160 | 70 | 120 |
| | 280° F. | 30 | 165 | 95 | 140 |
| | 290° F. | 40 | N.R. | N.R. | 80 |
| AVG. HEAT SEAL (gm/in.) | | | | | |
| X ± σ* | | 19 ± 12 | 142 ± 19 | 78 ± 19 | 145 ± 49 |
| AVG. COATING WT. (gm/1000in$^2$) | | 1.3 | 1.6 | 1.6 | 4.3 |

N.R. No Reading
*1 standard deviation

Table III compares the sealing behavior of PVDC coated films formulated with and without the maleated polyolefinic adhesion promoters embodied in this invention. Both the maleated polyethylene and the maleated polypropylene modifiers almost double the average heat-seal strength over the control films of conventional corona discharge treated polypropylene.

The heat-seal humidity resistance is also significantly increased with the addition of the maleated polyolefinic resins. Table IV compares the heat-seal humidity resistance obtained with different levels of modifier. The adhesion enhancement is even more significant when comparing this data. A 4 to 7 fold increase in humidity conditioned seal strength is experienced with these modifiers.

Although the present invention has been described with preferred embodiments, it is to be understood that modifications and variations may be resorted to, without departing from the spirit and scope of this invention as those skilled in the art will readily understand. Such variations and modifications are considered to be within the purview and scope of the appended claims.

I claim:

1. A composite consisting of a coated polypropylene film wherein the coating consists of a multipolymer formed from about 80% to about 90% by weight of vinylidene chloride and from about 20% to about 10% by weight of at least one other comonomer; said polypropylene film consisting of a layer formed from a blended mixture of from about 90% to about 99% by weight of isotactic polypropylene and from about 10% to about 1% by weight of a maleic anhydride-modified ethylene, propylene or butene polymer.

2. A coated polypropylene film in accordance with claim 1 wherein the amount of maleic anhydride-modified ethylene, propylene or butene polymer is from about 2% up to about 5% by weight based upon the weight of the polypropylene resin employed in said polypropylene film.

3. A coated polypropylene film as defined in claim 1 wherein said comonomer of said coating is selected from the group consisting of vinyl chloride, acrylonitrile methyl acrylate, ethyl acrylate, methyl methacrylate, butylacrylate, 2 ethyl-hexyl acrylate, acrylic acid, methacrylic acid, and Na-2-(methacroyloxy) ethane sulfonate.

* * * * *